US011936936B2

(12) United States Patent
Smolic et al.

(10) Patent No.: US 11,936,936 B2
(45) Date of Patent: Mar. 19, 2024

(54) METHOD AND SYSTEM FOR PROVIDING AND DISPLAYING OPTIONAL OVERLAYS

(71) Applicant: Disney Enterprises, Inc., Burbank, CA (US)

(72) Inventors: Aljoscha Smolic, Burbank, CA (US); Nikolce Stefanoski, Burbank, CA (US); Oliver Wang, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 14/510,840

(22) Filed: Oct. 9, 2014

(65) Prior Publication Data
US 2015/0135212 A1 May 14, 2015

Related U.S. Application Data

(60) Provisional application No. 61/888,738, filed on Oct. 9, 2013.

(51) Int. Cl.
*H04N 21/41* (2011.01)
*H04N 21/431* (2011.01)
*H04N 21/4722* (2011.01)
*H04N 21/4725* (2011.01)
*H04N 21/488* (2011.01)

(52) U.S. Cl.
CPC ..... *H04N 21/4122* (2013.01); *H04N 21/4316* (2013.01); *H04N 21/4722* (2013.01); *H04N 21/4725* (2013.01); *H04N 21/4882* (2013.01)

(58) Field of Classification Search
CPC ............. H04N 21/478; H04N 21/6125; H04N 21/2365; H04N 21/488; H04N 21/8133
See application file for complete search history.

(56) References Cited

U.S. PATENT DOCUMENTS

| 8,341,662 | B1 * | 12/2012 | Bassett | H04N 5/4401 |
| | | | | 375/240.26 |
| 8,752,113 | B1 * | 6/2014 | Good et al. | |
| 2002/0007493 | A1 * | 1/2002 | Butler et al. | |
| 2003/0149618 | A1 * | 8/2003 | Sender | G06Q 30/0277 |
| | | | | 705/26.1 |
| 2005/0204387 | A1 * | 9/2005 | Knudson et al. | |
| 2010/0023398 | A1 * | 1/2010 | Brown | G06Q 30/02 |
| | | | | 705/14.49 |
| 2010/0026809 | A1 * | 2/2010 | Curry | H04N 5/23238 |
| | | | | 348/157 |

(Continued)

OTHER PUBLICATIONS

Recommendation ITU-T H.265 (Apr. 2013) High efficiency video coding (Year: 2013).*

(Continued)

*Primary Examiner* — Junior O Mendoza
(74) *Attorney, Agent, or Firm* — Fay Kaplun & Marcin, LLP

(57) ABSTRACT

A method including receiving video of an event; generating an overlay for the video; generating an information message containing information enabling a receiver of the video and the overlay to selectively display or hide the overlay; and transmitting the video, the overlay, and the information message. The video is transmitted in a primary stream of a multi-stream transmission including a primary stream and one or more auxiliary streams. The overlay is transmitted in a first one of the auxiliary streams.

17 Claims, 8 Drawing Sheets

(56) References Cited

U.S. PATENT DOCUMENTS

| | | | |
|---|---|---|---|
| 2011/0320627 A1* | 12/2011 | Landow | H04N 21/4348 709/231 |
| 2012/0075531 A1* | 3/2012 | Carroll | H04N 5/445 348/584 |
| 2013/0002716 A1* | 1/2013 | Walker | G06Q 10/00 345/629 |
| 2013/0162911 A1* | 6/2013 | Glen | H04N 21/234327 348/586 |
| 2013/0311595 A1* | 11/2013 | Milatinovici | H04N 21/26275 709/214 |
| 2014/0152766 A1* | 6/2014 | Ogawa et al. | |
| 2014/0281014 A1* | 9/2014 | Good | H04N 19/40 709/231 |
| 2015/0074735 A1* | 3/2015 | Herigstad et al. | |
| 2015/0309687 A1* | 10/2015 | Herigstad | H04N 21/478 715/784 |
| 2016/0261927 A1* | 9/2016 | Smolic | H04N 21/4722 |
| 2016/0373789 A1* | 12/2016 | Tsukagoshi | H04N 21/235 |

OTHER PUBLICATIONS

MISB Standard 0604.1 (Sep. 30, 2010) Time Stamping and Transport of Compressed Motion Imagery and Metadata (Year: 2010).*
ITU-T Recommendation H.222.0 (May 2006) Information technology—Generic coding of moving pictures and associated audio information: Systems (Year: 2006).*

* cited by examiner

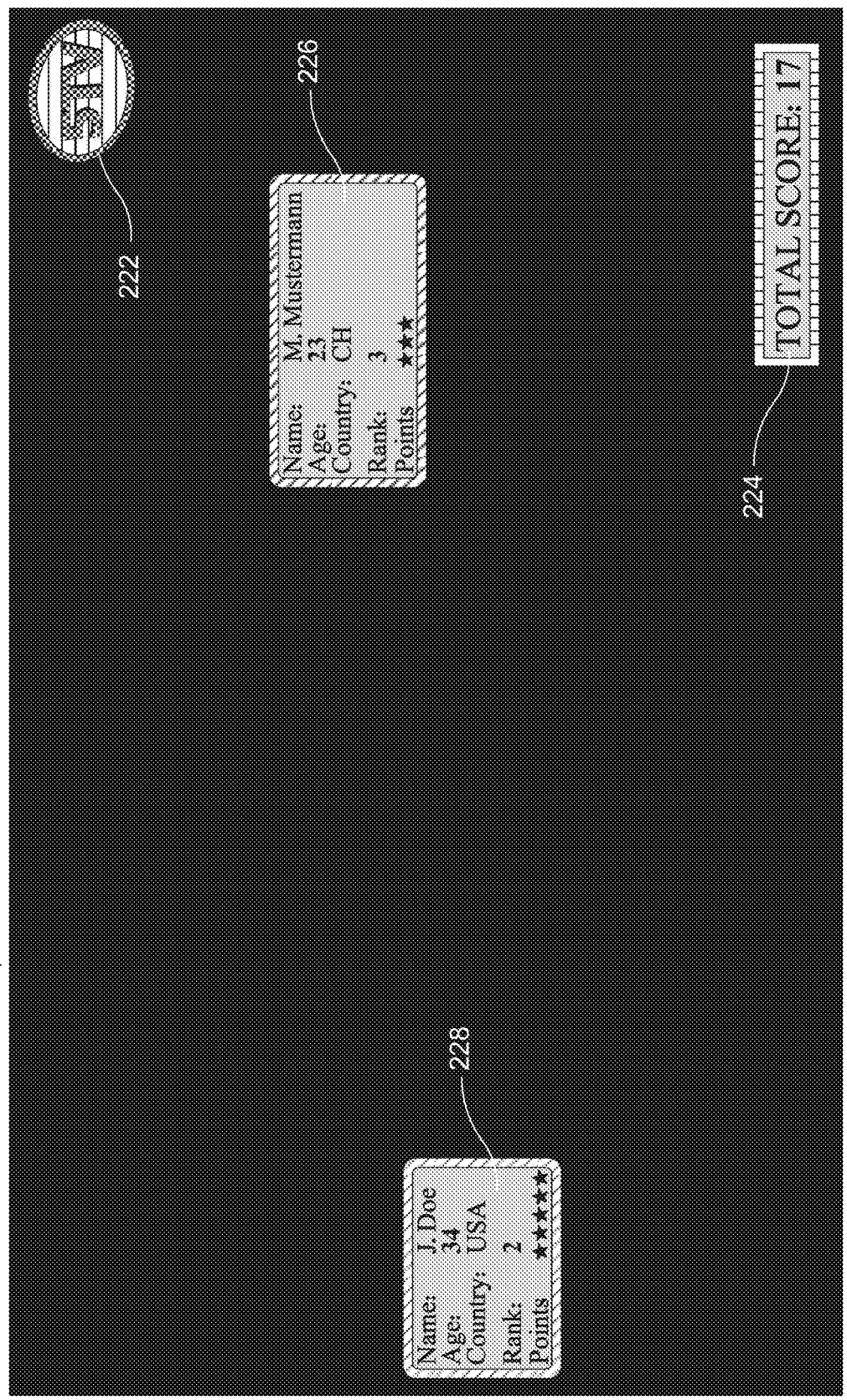

METHOD AND SYSTEM FOR PROVIDING AND DISPLAYING OPTIONAL OVERLAYS

BACKGROUND

Viewers of sporting events often wish to have additional information provided during a broadcast. Typically, this information is provided either verbally by a commentator or visually through the use of informational overlays (or inlays) that show information as part of the video broadcast. However, both of these approaches provide information at the discretion of the broadcaster, and, thus, often do not align with the interests of the viewer, or a third party. Prior methods of providing optional visual overlays use an approach wherein video is broadcast in a standard format, while overlays are sent separately over the Internet, but this approach can lead to synchronization problems.

Viewers of sporting events often wish to receive additional information beyond that which is contained in the broadcast video itself. This information may include the score of the game, the game clock, the players currently in the game, the roles of players currently in the game, in-game and historical statistics, the position of the ball within the playing surface, etc. This information is typically provided either verbally by a commentator, or visually through the insertion of overlays or inlays into the video image. In either case, the broadcaster of the event (e.g., the commentator or director) decides what specific information (e.g., game enhancements) should be provided. This does not always match the interests of the viewer. For example, a purist viewer may wish to watch a video broadcast with no additional information provided; a novice viewer may wish to be provided with all additional information that is available; a typical viewer may wish to view some additional information but not all.

Therefore, it may be desirable to provide viewers with optional overlays; that is, the ability to choose which of one or more provided overlays to show on the viewer's screen. Prior efforts to provide optional overlays have involved the use of two different transmission channels. For example, a video signal may be transmitted over a cable or satellite television network, while overlay data is transmitted over the Internet in the form of metadata including the information required to render the overlay. This approach may typically suffer from temporal synchronization problems, as the video data may be out of synchronization with the overlay data. Further, because the overlay data is transmitted in the form of metadata, separate rendering capabilities are required at the viewer's premises in order to render an overlay to be displayed with the video. Additionally, overlay data under such an approach is typically transmitted in a proprietary format, preventing broad applicability of the overlay.

BRIEF DESCRIPTION OF THE DRAWINGS

FIG. 2C shows an exemplary overlay picture containing the overlays of FIG. 2A without the underlying broadcast video image.

DETAILED DESCRIPTION

Figure 1:
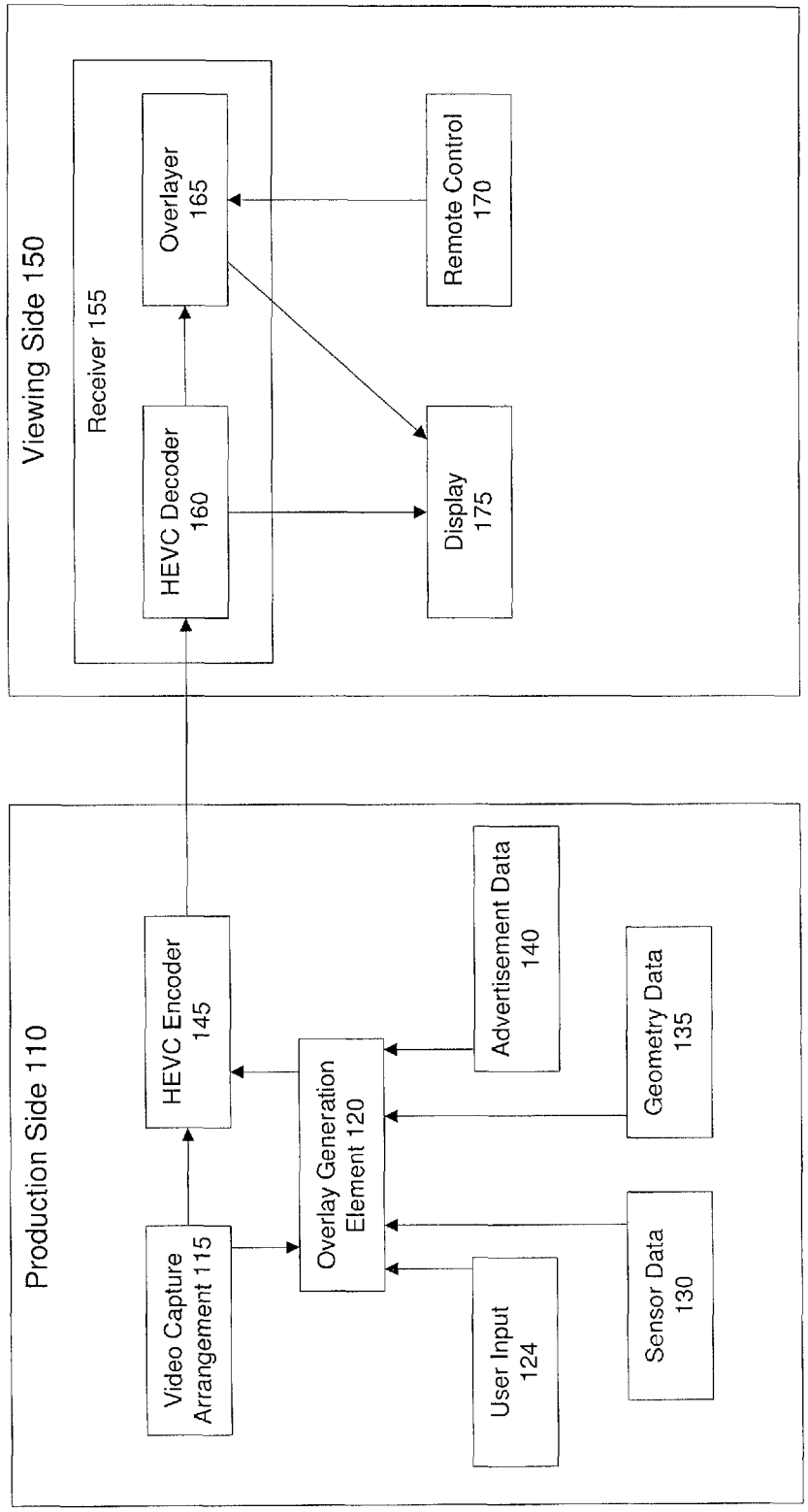
FIG. 1 shows a schematic view of a system for providing and displaying optional overlays according to an exemplary embodiment.

The exemplary embodiments may be further understood with reference to the following description and the related appended drawings, wherein like elements are provided with the same reference numerals. Specifically, the exemplary embodiments relate to methods and systems for providing and displaying optional overlays for sporting events or other broadcasts.

The exemplary embodiments are described herein with specific reference to sporting events. However, it will be apparent to those of skill in the art that the broader principles described are equally applicable to any other type of event. For example, a broadcast of a news program may include an optional overlay showing a crawling display of updated headlines; a broadcast of financial news may include optional overlay of a stock ticker. In another exemplary embodiment, the functionality of optional overlays may be used to remove overlays that are by default included in a video broadcast; for example, advertisements could be included in a video broadcast by default, and subscribers to a premium service could be provided with optional overlays replacing the advertisements with additional video content.

Traditional broadcasts of sporting events or other television programs include a single view. Newer transmission methods are capable of broadcasting two or more views as part of the same transmission. Prior applications for this type of broadcast include stereoscopic video. The exemplary embodiments use broadcasts including multiple streams, previously used to support multiple views of an event, to transmit optional overlays for sporting events or other broadcasts. The exemplary embodiments will be described herein with reference to the second version of the High Efficiency Video Coding ("HEVC") standard, currently in development, which will enable efficient compression of stereo video; however, those of skill in the art will recognize that this is only exemplary and that other transmission formats may also be used. The exemplary embodiments provide event video in the primary stream of a broadcast encoded with the second version of the HEVC codec, and provide overlays in one or more auxiliary streams.

FIG. 1 illustrates a schematic view of a system 100 for generating, providing, and displaying optional overlays. The system 100 includes a production side 110 and a viewing side 150. The production side includes a video capture arrangement 115 (e.g., one or more cameras capturing video of a sporting event). The video captured by the video capture arrangement 115 is provided to an overlay generation element 120, which may use the video, together with other input, to generate one or more overlays for inclusion with the video. The overlay generation element 120 may receive input from various sources. The sources may include user input 125, which may be accomplished through any means for providing user input, such as through a user-operated computing arrangement. The sources may further include sensor data 130, which may provide data on player positions, ball position, etc. The sources may further include geometry data 135, which may include data about stadium dimensions, playing field dimension, etc. The sources may further include advertisement data 140, which may include advertisements to be provided within an overlay during the broadcast. Those of skill in the art will understand that the list of sources of input for the overlay generation element 120 listed herein are only exemplary, and that other sources of input may also be used without departing from the broader principles described herein.

The overlay generation element 120 may use the captured video from the video capture arrangement 115, together with the input from various other sources (e.g., user input 125, sensor data 130, geometry data 135, and advertisement data 140) to generate one or more two-dimensional overlays for inclusion with the captured video. The specific contents and generation of the overlays are beyond the scope of the exemplary embodiments; this may be accomplished through the known techniques for providing non-optional video overlays within broadcasts of sporting events. The video captured by the video capture arrangement 115 and the overlays generated by the overlay generation element 120 are provided to an HEVC encoder 145, which may encode the video and the overlays into a single broadcast for transmission using the second version of the HEVC standard in a manner that will be described in further detail below. Though the production side 110 is shown within a single object perimeter in FIG. 1, those of skill in the art will understand that this is only a schematic representation, and that the different elements of the production side 110 may be located at different physical premises or may be operated at a different time. For example, the video capture arrangement 115 and sensor data 130 may be physically located at the site where an event is taking place, while the overlay generation element 120, user input 125, geometry data 135, advertisement data 140, and HEVC encoder 145 may be physically located at an event broadcaster's central facility or at a downstream distribution station.

Once the video and overlays have been encoded by the HEVC encoder 145, the encoded broadcast is sent to the viewing side 150 using a transmission technique such as cable television broadcast, satellite television broadcast, IP television broadcast, etc. It will be apparent to those of skill in the art that the inclusion in FIG. 1 of one viewing side 150 is simplified for clarity, and that the same broadcast may be sent to any number of viewers of an event through the same or different transmission techniques. The broadcast is received at the viewing side 150 by a receiver 155 (e.g., a cable television receiver, satellite television receiver, set top box, etc.) at an end-user location or a distribution station. It is anticipated that, upon widespread adoption of the second version of the HEVC standard mentioned above, the receiver 155 may include an HEVC decoder 160 that may allow for the decoding of ah HEVC broadcast encoded in accordance with the second version of the HEVC standard and including one or more auxiliary streams. It should be apparent to those of skill in the art that, though the exemplary system 100 includes a receiver 155, the HEVC decoder 160 may alternately be part of a different type of device, such as a smart television, a desktop or notebook computer, a tablet or smart phone, etc. For example, the HEVC decoder 160 may be implemented as a set of instructions that are executable by a processor. In another example, the HEVC decoder 160 may be implemented as an integrated circuit (e.g., application specific integrated circuit ("ASIC")) that may or may not include firmware.

The HEVC decoder 160 provides the video broadcast and the overlays to an overlayer 165, which may also be part of the receiver 155. The receiver 155 receives user input from a remote control 170, via which a viewer at the viewing side 150 may select one or more of the overlays (or, alternately, none of the overlays) for inclusion on the display shown to the viewer. If one or more overlays have been selected, the overlayer 165 then displays the one or more overlays on the video broadcast and outputs the broadcast and overlay(s) to a display 175, such as a television display. As above, the use of a remote control is only exemplary; in an embodiment wherein the display is provided to a tablet device, the HEVC decoder 160, overlayer 165, remote control 170 and display 175 may all be integrated within a single device. In another embodiment, a secondary screen (e.g., a tablet device) could be used to control the display of overlays on a primary screen (e.g., a television or another type of display 175); in such an embodiment, the secondary screen may communicate with the receiver 155 or directly with the display 175.

Figure 2A:
FIG. 2A shows an exemplary broadcast video image including superimposed overlays.
Figure 2B:
FIG. 2B shows the exemplary broadcast video image of FIG. 2A with the superimposed overlays removed.

FIG. 2A illustrates a still image 200 from an exemplary video broadcast with overlays. The still image 200 includes a picture 210 showing two bicyclists; it will be apparent to those of skill in the art that the specific content shown is only exemplary. The still image 200 also includes four overlay elements: a program logo overlay element 222, a score overlay element 224, and two information overlay elements 226 and 228. FIG. 2B illustrates the picture 220 without any overlays included. FIG. 2C illustrates an overlay picture 230 showing the overlay elements 222-228 without the underlying picture 210. The overlay picture 230 may be represented using three color channels.

Figure 2D:
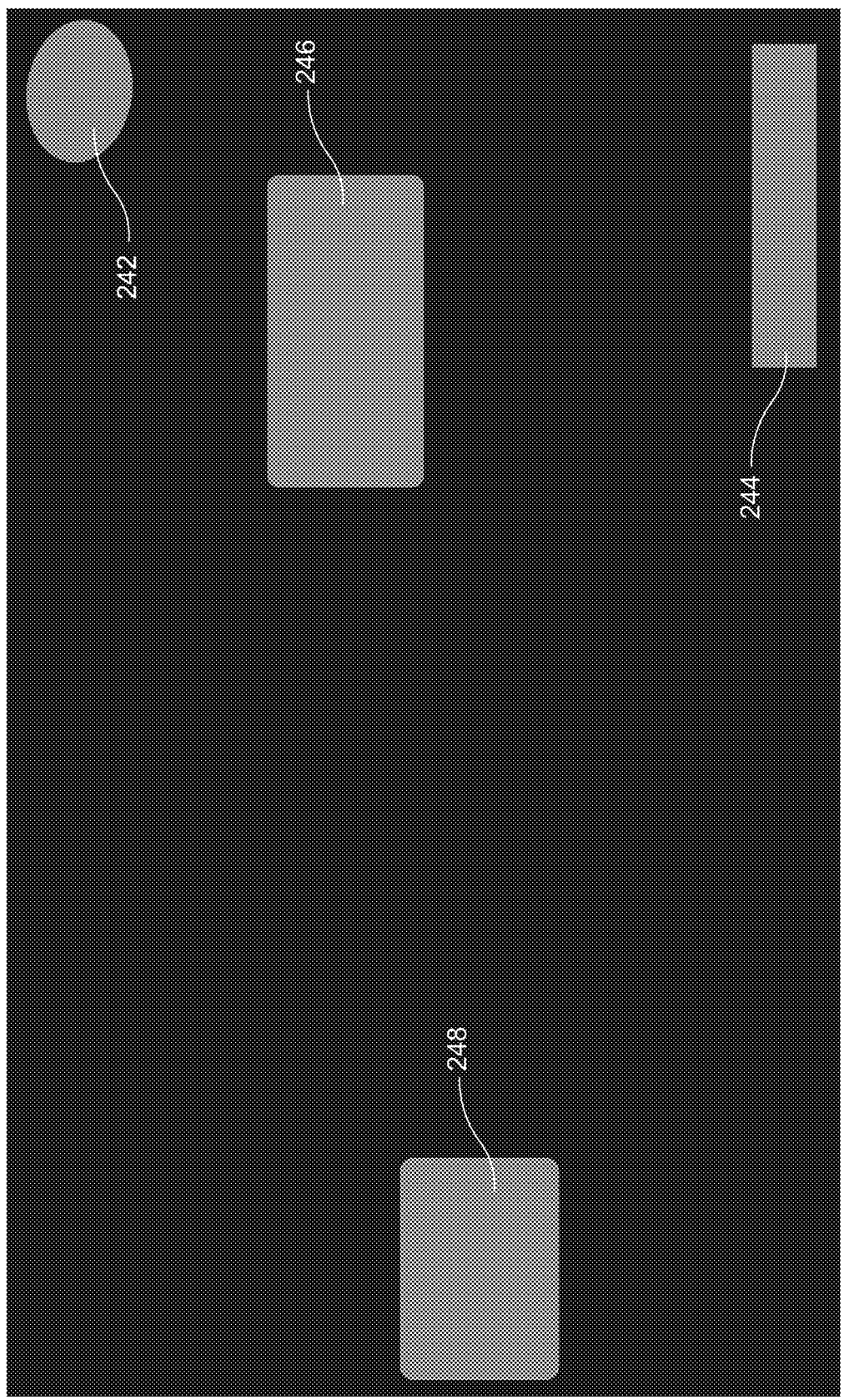
FIG. 2D shows an exemplary label picture used by an exemplary system to distinguish embedded overlays from each other.
Figure 2E:
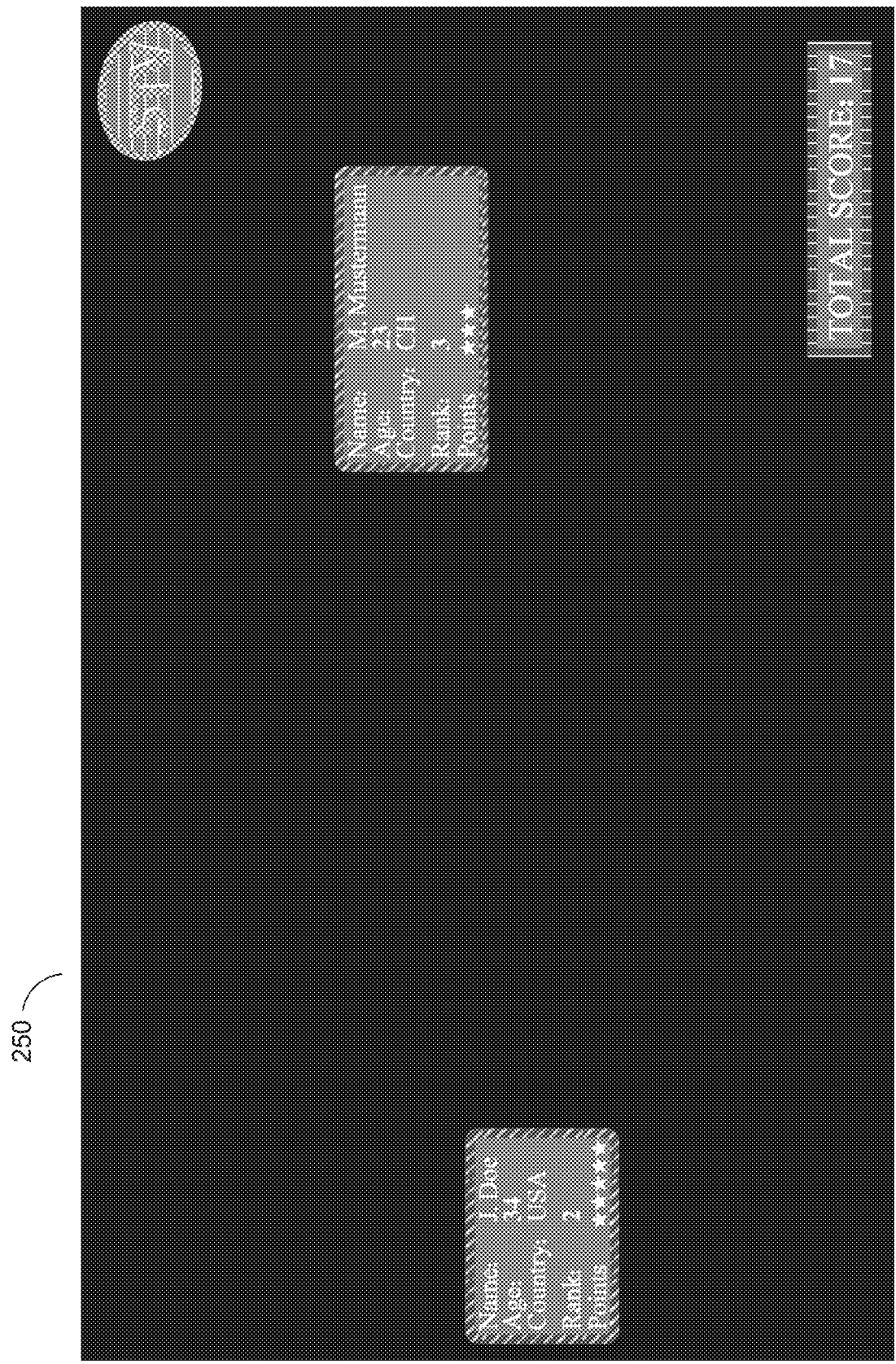
FIG. 2E shows an exemplary alpha matte picture used by an exemplary system to provide transparent overlays.

FIG. 2D illustrates a label picture 240 showing labels 242, 244, 246 and 248 for the different overlay elements 222-228 of the prior figures, which may be used in a manner that will be described below to identify single overlay elements. The label picture 240 may be represented in one color channel (e.g., in grayscale). FIG. 2E illustrates an alpha matte picture 250 showing an alpha matte describing the level of transparency for each pixel of the overlay picture 230. Like the label picture 240, the alpha matte picture 250 may also be represented in one color channel (e.g., in grayscale). The alpha matte picture 250 may be used to display one or more of the overlay elements 222-228 in a semitransparent manner. The alpha matte picture 250 may be also used to address occlusion in cases where it is required of an overlay not to occlude dynamic objects in the video. In this case, the alpha matte pixels that correspond to occluding overlay pixels will set to zero.

Figure 3:
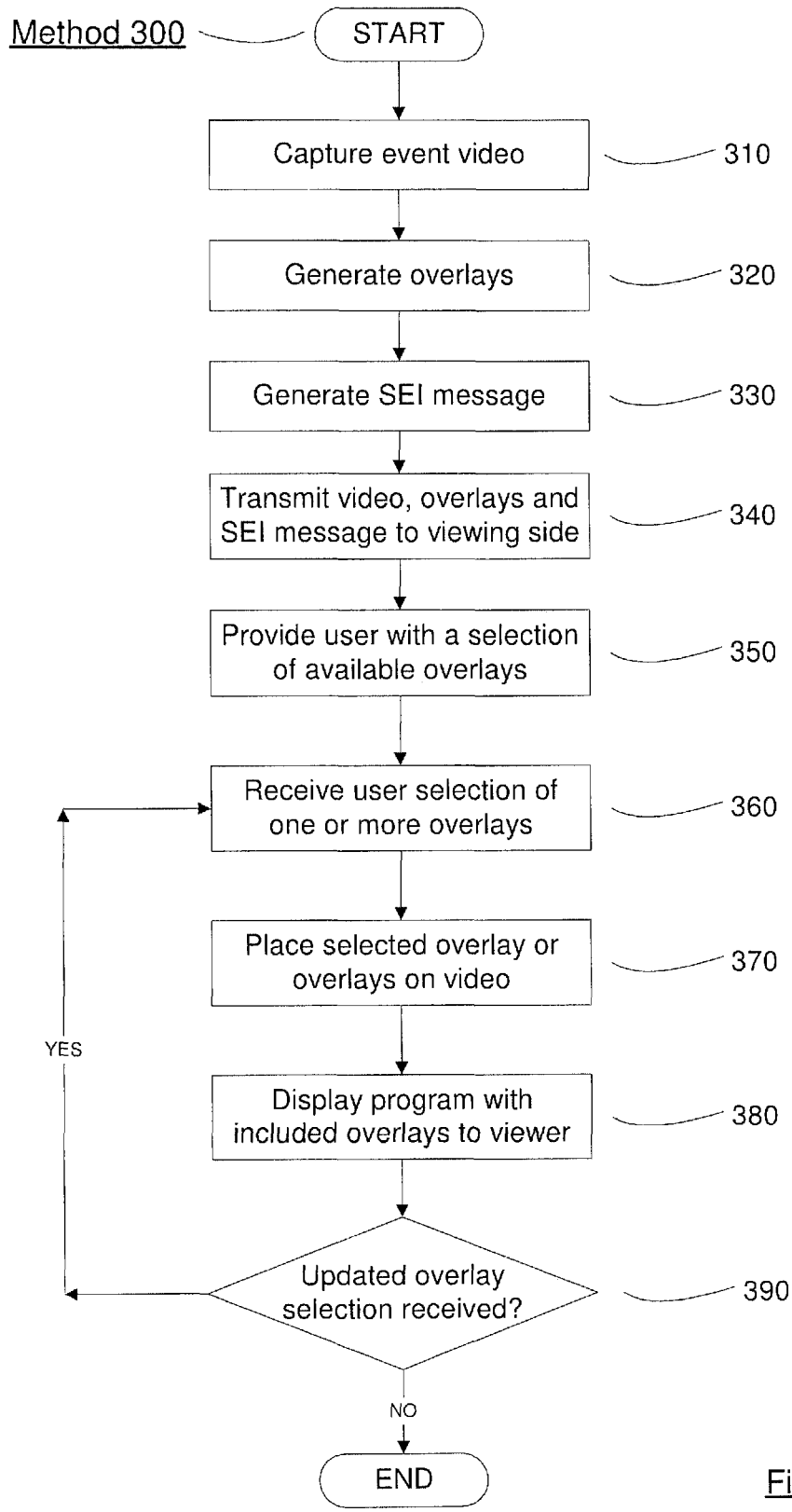
FIG. 3 shows a method for providing and displaying optional overlays according to an exemplary embodiment.

FIG. 3 shows an exemplary method 300 for providing a viewer of the video broadcast including the picture 210 to select one or more overlays for inclusion. The exemplary method 300 will be described with specific reference to the system 100 of FIG. 1 and the image and overlays depicted in FIGS. 2A-2C, but those of skill in the art will understand that this is only exemplary. In step 310, video is captured by the video capture arrangement 115. This may be accomplished using standard techniques of capturing video of sporting or other events. In step 320, one or more overlays (e.g., overlay elements 222, 224, 226 and 228) are generated relating to the captured video by the overlay generation element 120, using data from the video capture arrangement 115 as well as one or more of the sources shown in FIG. 1, such as user input 125, sensor data 130, geometry data 135, and advertisement data 140. For example, it may be considered that the overlay 222 that includes the program logo may be generated from advertisement data 140. In a further example, the score overlay element 224 may be generated from sensor data 130 (e.g., when a sensor receives input from a scoreboard at an event or views a scoreboard and extracts score data) or user input 125 (e.g., where a user such as an employee of the broadcaster manually enters the scores into an input device while the event is occurring). The overlay or overlays generated in this step may be in a pixel (i.e., image) format, thereby eliminating the need for rendering at the viewing side 150. This step may also include the generation of a label picture 240 and an alpha matte picture 250, as shown in FIGS. 2D and 2E, respectively.

In step 330, the overlay generation element 120 generates a supplemental enhancement information ("SEI") message providing information about the one or more overlays generated in step 320. In an alternative embodiment, the system 100 may include an additional SEI message generation element dedicated to generating an SEI message from input received from the overlay generation element 120. Generally, a SEI message is a message that is part of the second version of the HEVC standard and carries various types of information about the type of data encoded in an HEVC transmission by an encoder (e.g., HEVC encoder 145) to a decoder (e.g., HEVC decoder 155). The exemplary embodiments present an example of a SET message that may be included in the second version of the HEVC standard to indicate that auxiliary streams contained in the HEVC transmission are to be used to provide optional overlays, and to provide information that is required to identify single overlay elements. The following is a first exemplary syntax of an exemplary SEI message:

|  | Descriptor |
|---|---|
| optional_overlays_info ( payloadSize ) { |  |
|   oov_info_cancel_flag | u(1) |
|   if( oov_info_cancel_flag = = 0 ) { |  |
|     oov_setup_id | u(3) |
|     oov_ol_views_cnt_minus1 | ue(v) |
|     oov_ol_elem_cnt_minus1 | ue(v) |
|     for ( i=0; i <= oov_ol_elem_cnt_minus1; i++ ) { |  |
|       for ( j=0; j <= oov_ol_views_cnt_minus1; j++ ) |  |
|         oov_ol_elem_name[i][j] | f(512) |
|       oov_label_id[i] | u(v) |
|     } |  |
|     oov_label_offset | u(v) |
|     if ( oov_setup_id == 0 \|\| oov_setup_id == 1 ) |  |
|       oov_alpha_present_flag | u(1) |
|   } |  |
| } |  |

The above SEI message may indicate that decoded streams (e.g., the primary stream and one or more auxiliary streams) are to be interpreted as two-dimensional video and overlay data. This indication may persist until a new video stream begins, until the bit stream ends, or until an overriding SEI message is received. The following provides a description of the exemplary elements that are provided in the above SEI message.

The oov_info_cancel_flag parameter equal to 1 indicates that the SEI message shown cancels the persistence of any previous optional overlays SEI message in output order. An oov_info_cancel_flag equal to 0 indicates that optional overlays information follows.

The oov_setup_id parameter indicates a setup of streams according to the following table:

| Value | Description |
|---|---|
| 0 | Setup A |
| 1 | Setup B |
| 2 | Setup C |
| 3-15 | Reserved |

Figure 4:
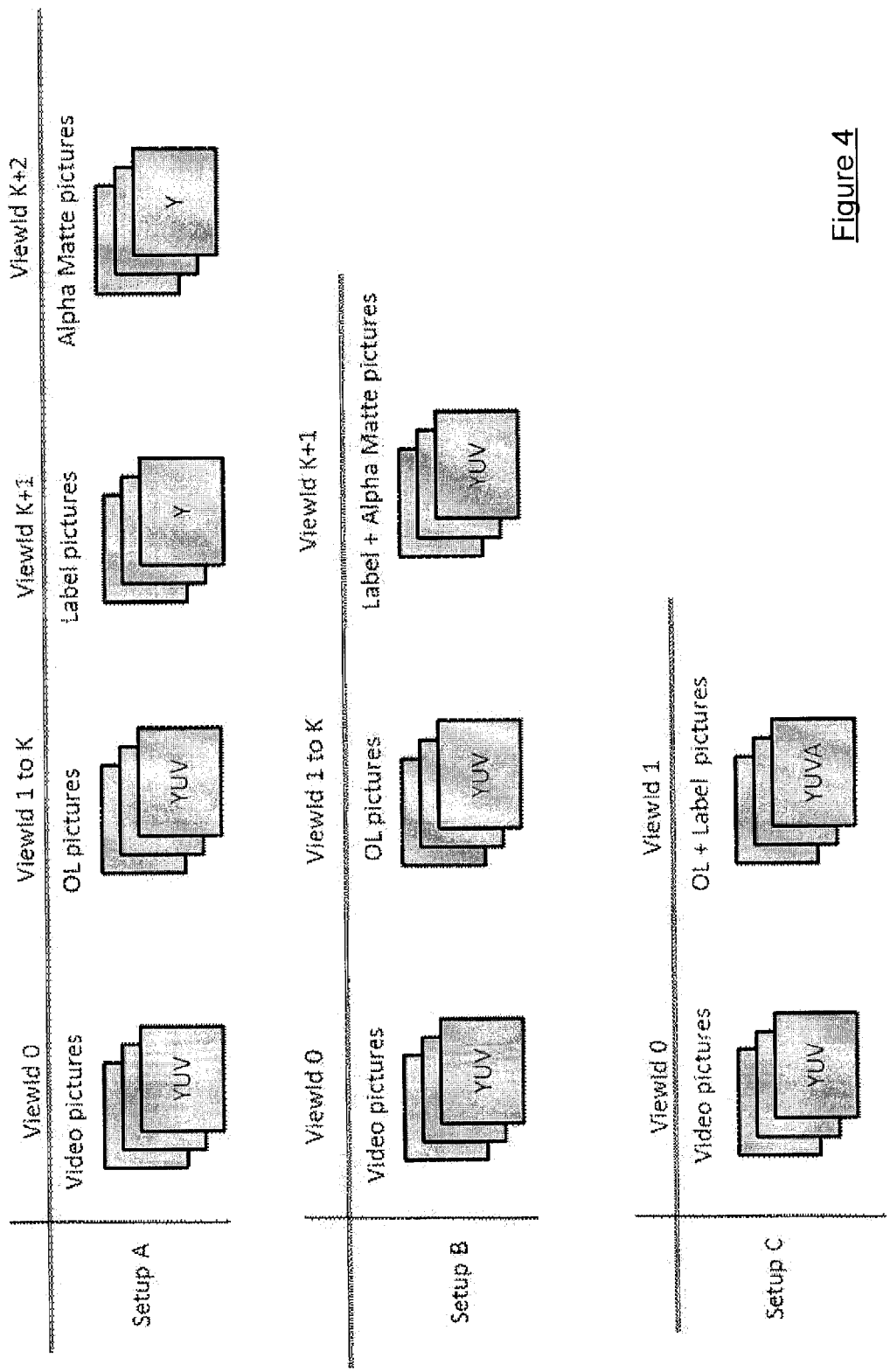
FIG. 4 shows three alternative exemplary setups for encoding the broadcast video image of FIG. 2B, the overlays of FIG. 2C, the label picture of 2D, and the alpha matte picture of FIG. 2E.

The exemplary embodiments may use three separate setups to represent overlay data. In this description, the variable K will be used to indicate the number of separate overlay elements to be included with a broadcast. FIG. 4 illustrates these three setups A, B and C. In each of Setups A, B and C, view ID 0 (e.g., the primary stream of a broadcast encoded according to the second version of the HEVC standard) shows, in three color channels, the video captured by video capture arrangement 115 and shown in FIG. 2B. In Setup A, view IDs 1 to K (e.g., K number of auxiliary streams) are used to broadcast, in three color channels per view, K overlay pictures in separate views, where K is greater than or equal to 1. View ID K+1 (e.g., one auxiliary stream) is used to broadcast, in one color channel, a label picture (e.g., label picture 240 of FIG. 2D). ViewID K+2 (e.g., one auxiliary stream) is used to broadcast, in one color channel, an alpha matte picture (e.g., alpha matte picture 250 of FIG. 2E). Thus, using Setup A, the total number of streams used is K+3 (e.g., one primary stream and K+2 auxiliary streams), e.g., if the picture types represented in FIGS. 2B to 2E are used in an exemplary broadcast, one overlay pictures view (i.e., K=1) with four overlay elements is used, i.e. four total streams: a primary stream consisting of three color channels for the video pictures; an auxiliary stream consisting of three color channels for the overlay pictures; an auxiliary stream, consisting of one color channel, for the label pictures; and an auxiliary stream, consisting of one color channel, for the alpha matte pictures. Optionally, more than one stream showing overlay pictures could be used (i.e., K>1). In such an embodiment, the additional streams may represent alternative realizations for the overlay elements that are shown in the first overlay pictures stream.

In Setup B, view IDs 1 to K (e.g., K number of auxiliary streams) are used to broadcast, in three color channels per stream, K overlay pictures in separate views, in the same manner as in Setup A. View ID K+1 (e.g., one auxiliary stream) is used to broadcast, in two color channels, a label picture (e.g., label picture 240 of FIG. 2D) and an alpha matte picture (e.g., alpha matte picture 250 of FIG. 2E). Thus, using Setup B the total number of streams used is K+2 (one primary stream and K+1 auxiliary streams), e.g., if the picture types represented in FIGS. 2B to 2E are used in an exemplary broadcast, only one overlay pictures stream (i.e., K=1) with four overlay elements is used, i.e. three total views are used: one view consisting of three color channels for the video pictures; one stream consisting of three color channels for the overlay pictures; and one stream consisting of three color channels where only two color channels are used, one view for the label pictures and one view for the alpha matte pictures.

In Setup C, view ID 1 (e.g., one auxiliary stream) is used to broadcast, in four channels, all of the overlays together with a label picture. Thus, a combined overlay picture including all overlays (e.g., the combined overlay picture of 230 FIG. 2C) is broadcast in three color channels, together with a label picture (e.g., label picture 240 of FIG. 2D). Thus, using Setup C the total number of views used is two: one view (e.g., a primary stream) consisting of three color channels for the video pictures, and one view (e.g., one auxiliary stream) consisting of three color channels for the overlay pictures and one color channel for the label picture. Because Setup C does not include an alpha matte channel, no transparency of the overlays may be provided.

It will be apparent to those of skill in the art that any of Setups A, B or C may be chosen depending on the preference of the broadcaster or the capabilities of the receiving devices. For example, Setup A may be used to transmit a set of alternative overlay elements or to transmit semitransparent overlay elements; Setup C may be used when alternative overlay elements and transparencies are not needed or bandwidth used to broadcast is a concern. It will be apparent to those of skill in the art that, while FIG. 4 illustrates Setups A, B and C using a YUVA color space, this is only exemplary and other color spaces may alternatively be used.

Returning to the exemplary SEI message shown above, the oov_ol_views_cnt_minus1 parameter indicates the total number of streams used to represent overlay pictures minus 1. Thus, under Setups A and B, this is the number of overlay picture streams minus 1 (e.g., for the one overlay pictures stream shown in the exemplary embodiments, zero), while under Setup C, this value is always zero.

The oov_of_elem_cnt_minus1 parameter indicates the total number of overlay elements represented within one overlay picture minus 1.

The oov_of_elem_name parameter specifies a two dimensional array of names for all possible overlay elements. This may provide, to a viewer, descriptive designations (e.g., "Scoreboard", "Time Display", etc.) for each of the possible overlays. In the exemplary embodiment, each name for an overlay element is represented by a sequence of characters encoded by UTF-8, though this encoding is only exemplary and may vary among differing embodiments.

The oov_label_id parameter specifies an array of unique numeric identifiers for all possible overlay elements within a picture. Each identifier is represented by a numeric value in the range 0 . . . (1<<BitDepthY)−1, where BitDepthY is the bit depth of label pictures.

The oov_label_offset parameter is used to specify the range of values:

(oov_label_id−oov_label_offset) . . . (oov_label_id+oov_label_offset)

Positions of pixels in the label image having values in this range correspond to pixel positions of an overlay element with numeric identifier oov_label_id.

The oov_alpha_present_flag parameter specifies if alpha matte pictures are present. If oov_alpha_present_flag is equal to 1 alpha matte pictures are present. Otherwise, if oov_alpha_present_flag is equal to 0, alpha matte pictures are not present. In case of oov_setup_id=0 or oovsetupid=1 the value of the syntax element oov_alpha_present_flag may be parsed from the bit stream, while in case of oov_setup_id=2 the value of oov_alpha_present_flag is specified to be 0.

In step 340, the video captured in step 310, the overlays generated in step 320, and the SEI message generated in step 330 are encoded in an HEVC format according to the second version of the HEVC standard and transmitted from the production side 110 to the viewing side 150. As noted above, this transmission may be accomplished using any transmission method (e.g., cable, satellite, IP, etc.) capable of transmitting video in keeping with the second version of the HEVC standard. It will be apparent to those of skill in the art that, while the SEI message may only be sent at the beginning of a transmission, the video and overlays may constantly be changing and may be continuously sent throughout a broadcast.

In step 350, the HEVC decoder 155 decodes the video from the HEVC format into its constituent streams, parses the SEI message, and uses the information contained therein to provide a viewer with the option to select one or more of the overlays provided. In step 360, the user makes a selection of one or more of the overlays provided (e.g., using remote control 170).

In step 370, the overlayer 165 places the selected overlays onto the video according to the following process. Assume that resSamples$_{Vid}$, resSamples$_{Label}$, and resSamples$_{Alpha}$ represent arrays of reconstructed samples of stream 0, stream K+1 and stream K+2, respectively, as they are indicated Setup A as illustrated in FIG. 4. In addition, resSamples$_{OL}$[0] to resSamples$_{OL}$[K−1] represent arrays of reconstructed samples of streams 1 to K (i.e., overlay streams 1 to K). Note that the same arrays can be also derived if setup B is used. In contrast to setups A and B, in setup C overlay data is represented only by one array resSamples$_{OL}$[0], i.e. K=1, and no resSamples$_{Alpha}$ array is provided and oov_alpha_present_flag is always equal to 0.

Further, as noted above, assume that a viewer selects a subset of all available overlay elements. This subset of overlay elements may be specified by two arrays, array user_oov_label_id[.] of size user_oov_label cnt, and array user_oov_ol_view_id[.] of the same size. The array user_oov_label_id contains a subset of the values of array oov_label_id, while array user_oov_ol_view_id contains values between 0 and oov_ol_views_cnt_minus1 and identifies the overlay stream used to get the overlay information. The arrays together uniquely specify the subset of overlay elements that are selected by the user.

Using the above inputs for the first exemplary syntax described above, the following derivation process computes a samples array resSamples$_{VidOut}$ representing a picture overlaid with the user-selected overlays.

```
for( y=0; y  <=  pic_height_in_luma_samples; y++ ) {
    for( x=0; x  <=  pic_width_in_luma_samples; x++ ) {
        alpha=0
        ov_view_id_cur = 0
        for( i=0; i  <=  user_oov_label_cnt; i++ ){
            if ( ( user_oov_label_id[i] − oov_label_offset)
                <=  resSamplesLabel [x][y] &&
                (user_oov_elem_id[i] + oov_elem_offset) >=
                resSamplesLabel [x][y] ) {
                    alpha = 1
                    ov_view_id_cur =
                    user_oov_ov_view_id[i]
            }
        }
        if ( oov_alpha_present_flag == 1 && alpha == 1)
            alpha = resSamplesAlpha[x][y] ÷ ( (1  <<
                BitDepthY) − 1 )
        resSamplesVidOut[x][y] = ( 1 − alpha ) *
        resSamplesVid[x][y] +
        alpha * resSamplesOL[ov_view_id_cur][x][y]
    }
}
```

In step 380, the receiver 155 provides the overlaid picture (e.g., the array resSamples$_{VidOut}$) to the display 175 for display to the viewer. While the program is being broadcast, the viewer may subsequently change the selected overlays using the remote control 170. Thus, in step 390, during the broadcast the overlayer 165 continuously monitors whether a changed user selection of overlays has been received via the remote control 170. If a changed user selection has been received, the method returns to step 360, and steps 360-380 are repeated to generate an updated view including overlays. It will be apparent to those of skill in the art that step 390 represents a continuous monitoring state during which the receiver 155 waits for input from a user, and that the method may continue to wait in step 390 for the duration of the broadcast being viewed. If no change in selection is received, then the method terminates after step 390 when the broadcast is terminated.

It will be apparent to those of skill in the art that the first exemplary syntax described above is only one possible implementation of a syntax for an SEI message, and different syntaxes may be used without departing from the broader principles defined by the exemplary embodiments. The following presents a second exemplary syntax for an SEI message, together with corresponding definitions.

```
overlay_info( ) {
    overlay_info_cancel_flag                              u(1)
    if (!overlay_info_cancel_flag) {
        overlay_content_aux_id_minus128                   ue(v)
        overlay_label_aux_id_minus128                     ue(v)
        overlay_alpha_aux_id_minus128                     ue(v)
        num_overlays_minus1                               ue(v)
        overlay_info_name_len                             ue(v)
        for( i = 0; i < num_overlays_minus1; i++ ) {
            overlay_name[ i ]                             f(v)
            overlay_content_layer_id[ i ]                 u(6)
            overlay_label_present_flag[ i ]               u(1)
            if (overlay_label_present_flag[ i ])
                overlay_label_layer_id[ i ]               u(6)
            overlay_alpha_present_flag[ i ]               u(1)
            if (overlay_alpha_present_flag[ i ])
                overlay_alpha_layer_id[ i ]               u(6)
            if (overlay_label_present_flag[ i ]) {
                num_overlay_elements_minus1[ i ]          ue(v)
                for( j = 0;
                    j <= num_overlay_elements_minus1[ i ]; j++ ) {
                    overlay_element_name[ i ][ j ]        f(v)
                    overlay_element_label_min[ i ][ j ]   u(v)
                    overlay_element_label_max[ i ][ j ]   u(v)
                }
            }
        }
        overlay_info_persistence_flag                     u(1)
    }
}
```

The overlay_info_cancel_flag parameter equal to 1 indicates that the SEI message cancels the persistence of any previous overlay information SEI message in output order. Conversely, the overlay_info_cancel_flag parameter equal to 0 indicates that overlay information follows.

The overlay_content_aux_id_minus128 parameter plus 128 indicates the value of AuxId of auxiliary pictures containing overlay content. In this exemplary syntax, the value of the overlay_contentaux_idminus128 parameter may be in the range of 0 to 15.

The overlay_label_aux_id_minus128 parameter plus 128 indicates the value of AuxId of auxiliary pictures containing overlay label. In this exemplary syntax, the value of the overlay_label_aux_id_minus128 parameter may be in the range of 0 to 15.

The overlay_alpha_aux_id_minus_128 parameter plus 128 indicates the value of AuxId of auxiliary pictures containing overlay alpha. In this exemplary syntax, the value of the overlay_alpha_aux_id_minus128 parameter may be in the range of 0 to 15.

The num_overlays_minus1 parameter specifies the number of overlays described. In this exemplary syntax, the value of the num_overlays_minus1 parameter shall be in the range of 0 to 15.

The overlay_info_name_length parameter specifies the length in characters of the overlay_element_name[i][j] syntax element. In this exemplary syntax, the value of the overlay_info_name_length parameter may be in the range of 0 to 256.

The overlay_name[i] parameter indicates the name of the i-th overlay represented by a sequence of characters. In this exemplary syntax, the sequence of characters may be encoded according to the UTF-8 encoding format, but it will be apparent to those of skill in the art that this is only exemplary and that other encoding formats may also be used. The length of the syntax element overlay_name[i] parameter in characters is given by the overlay_info_name_length parameter.

The overlay_content_layer_id[i] parameter indicates the nuh_layer_id value of the Network Abstraction Layer ("NAL") units of the overlay content of the i-th overlay. In this exemplary syntax, the value of the AuxId[overlay_content_layer_id[i]] parameter shall be equal to the value of the overlay_content_aux_id_minus128 parameter plus 128 for all values of i in 0 . . . num_overlays_minus1.

The i-th overlay is associated with the primary picture layer with nuh_layer_id equal to PLid, for which:

ViewOrderIdx[$P$Lid]=ViewOrderIdx[overlay_content_layer_id[$i$]]

DependencyId[$P$Lid]=DependencyId[overlay_content_layer_id[$i$]]

AuxId[$P$Lid]=0

The overlay_label_present_flag[i] parameter being equal to 1 specifies that overlay_label_layer_id[i] is present. Conversely, the overlay_label_present_flag[i] parameter being equal to 0 specifies that overlay_label_layer_id[i] is not present.

The overlay_label_layer_id[i] parameter indicates the nuh_layer_id value of NAL units in the overlay label of the i-th overlay. In this exemplary syntax, the value of the AuxId[overlay_label_layer_id[i] ] parameter shall be equal to the value of the overlay_label_aux_idminus128 parameter plus 128 for all values of i in 0 . . . num_overlays_minus1.

The overlay_alpha_present_flag[i] parameter being equal to 1 specifies that overlay_alpha_layer_id[i] is present. Conversely, the overlay alpha_present_flag[i] parameter being equal to 0 specifies that overlay_alpha_layer_id[i] is not present.

The value of the overlay_alpha layer_id[i] parameter indicates the nuh_layer_id value of NAL units in the overlay alpha of the i-th overlay. In this exemplary syntax, the value of the AuxId[overlay_alpha_layer_id[i] ] parameter shall be equal to the value of the overlay_alpha_aux_id_minus128 parameter plus 128 for all values of i in 0 . . . num_overlays_minus1.

The value of the num overlay elements minus1[i] parameter indicates the number of overlay elements in the i-th overlay. When not present, the value of the num over elements minus1[i] parameter is inferred to be equal to 0.

The overlay_element_name[i][j] parameter indicates the name of the j-th overlay element of the i-th overlay. In this exemplary syntax, this may be represented by a sequence of characters encoded according to the UTF-8 encoding format. The length of the syntax element overlay_element_name[i][j] is equal to overlay_info_name_length characters.

The parameters overlay_element_label_min[i][j] and overlay_element_label_max[i][j] indicate the minimum and maximum values, respectively, of the range of sample values corresponding to the j-th overlay element of the i-th overlay. The length of the overlay_element_label_min[i][j] and overlay_element_label_max[i][j] parameters is BitDepthY bits.

The overlay_info_persistence_flag parameter specifies the persistence of the overlay info SEI message. The overlay_info_persistence_flag parameter being equal to 0 specifies that the overlay info SEI message applies to the current decoded picture only. Conversely, the overlay_info_persistence_flag parameter being equal to 1 specifies that the overlay info SEI message persists in output order until one or more of the following conditions are true: a new CVS begins; the bitstream ends; or a picture in an access unit containing a overlay info SEI message is output having a value of PicOrderCntVal greater than PicOrderCnt(CurrPic).

For the second exemplary syntax described above, the following derivation process computes a samples array resSamples$_{VidOut}$ representing a picture overlaid with the user-selected overlays.

```
for( y=0; y  <=  pic_height_in_luma_samples; y++ ) {
    for( x=0; x  <=  pic_width_in_luma_samples; x++ ) {
        resSamples_VidOut[ x ][ y ] = resSamples_Vid[ x ][ y ]
        for( k=0; k  <  num_user_overlay_elements; k++ ){
            i = user_overlay_idx[ k ]
            j = user_overlay_element_idx[ k ]
            if ( overlay_label_present_flag[ i ] &&
                resSamples_Label [ i ][ x ][ y ] >=
overlay_element_label_min[ i ][ j ] &&
                resSamples_Label [ i ][ x ][ y ] <=
overlay_element_label_max[ i ][ j ] | |
                ! overlay_label_present_flag[ i ] ) {
                alpha = 1
                if ( overlay_alpha_present_flag[ i ] ) {
                    alpha = resSamples_Alpha[ i ][x][y]  .  ( (1  <<
BitDepth_Y) - 1 )
                }
                resSamples_VidOut[x][y] = ( 1 - alpha ) *
resSamples_Vid[x][y]  +
                    alpha * resSamples_Content[i][x][y]
            }
        }
    }
}
```

The exemplary embodiments described above may therefore enable a broadcaster of sporting events or other events to provide a broadcast including user-selectable optional overlays. The video and overlays may be transmitted in a single transmission channel, and may therefore provide for synchronization of video and overlays at the sending side rather than the receiver side, solving the synchronization problems that affect other approaches for providing optional overlays. The use of a standardized format such as a video broadcast using the second version of the HEVC standard may therefore provide for universal applicability. Further, the use of a pixel format for the overlays may allow broadcasters to have maximal artistic freedom in overlay generation, while minimizing the need for rendering at the viewing side. The viewer's user interface may then give the user the option to selectively show or hide the overlay or overlays transmitted in this manner; in this context, "hide" may simply mean that an overlay that is hidden is not shown on the user's display.

The exemplary embodiments have been described above with reference to overlays, i.e., graphics that are transposed "on top of" a video program being displayed. However, it will be apparent to those of skill in the art that the broader principles of the techniques described above with reference to the exemplary embodiments are equally applicable to inlays, i.e., graphics that are inserted in perspective at a physical location in the scene being shown. It will be further apparent to those of skill in the art that the overlays and inlays may be, among other types of graphics, an animation or video segment.

Those of skill in the art will understand that the above-described exemplary embodiments may be implemented in any number of matters, including as a software module, as a combination of hardware and software, etc. For example, the exemplary method 300 may be embodied in a program stored in a non-transitory storage medium and containing lines of code that, when compiled, may be executed by a processor.

It will be apparent to those skilled in the art that various modifications may be made to the exemplary embodiments, without departing from the spirit or the scope of the invention. Thus, it is intended that the present invention cover modifications and variations of this invention provided they come within the scope of the appended claims and their equivalents.

What is claimed is:

1. A method, comprising:
   receiving video of an event that is to be included in a multi-stream broadcast of a television program;
   generating an overlay for the video that is to be included in the multi-stream broadcast of the television program, wherein the overlay is generated based on at least data from a video capture arrangement that is capturing the video of the event;
   generating an information message corresponding to the video and the overlay, wherein the information message comprises a label of the overlay and a transparency parameter corresponding to the overlay;
   generating, the multi-stream broadcast of the television program, including a primary stream, one or more auxiliary streams, and the information message, wherein the primary stream includes the video, a first auxiliary stream of the one or more auxiliary streams includes the overlay, the label of the overlay is included in a second auxiliary stream of the one or more auxiliary streams and the transparency parameter corresponding to the overlay is included in a third auxiliary stream of the one or more auxiliary streams;
   broadcasting the multi-stream broadcast of the television program over the single transmission channel,
      wherein the video, the overlay, and the information message are synchronized prior to the broadcasting.

2. The method of claim 1, wherein the information message is included in the multi-stream broadcast.

3. The method of claim 1, further comprising:
   generating a further overlay for the video, wherein the further overlay is included in the multi-stream broadcast.

4. The method of claim 3, wherein the further overlay is included in one of the first auxiliary stream of the one or more auxiliary streams and a second auxiliary stream of the one or more auxiliary streams.

5. The method of claim 1, wherein the information message is a supplemental enhancement information (SEI)

message and wherein the multi-stream broadcast is encoded according to the second version of the High Efficiency Video Coding standard.

6. The method of claim 1, wherein the overlay includes one of a score of a game, a game clock, a player name, a player role, a current game statistic, a historical game statistic, a position of an in-game object, a news ticker, a stock ticker, and an advertisement.

7. The method of claim 6, wherein the overlay includes an advertisement, and wherein a viewer of the multi-stream broadcast may subscribe to a premium service to selectively remove the overlay.

8. The method of claim 1, wherein the overlay comprises an image including a plurality of pixels.

9. A system, comprising:
an interface receiving a multi-stream broadcast of a television broadcast over a single transmission channel, the multi-stream broadcast of the television broadcast including a primary stream, one or more auxiliary streams and an information message, the primary stream of the multi-stream broadcast includes video of an event, a first auxiliary stream of the one or more auxiliary streams includes an overlay for the video, a second auxiliary stream of the one or more auxiliary streams includes a label for the overlay and a third auxiliary stream of the one or more auxiliary streams includes a transparency parameter corresponding to the overlay, wherein the overlay is generated based on at least data from a video capture arrangement that is capturing the video of the event, wherein the information message includes data corresponding to the video and the overlay,
wherein the video, the overlay, and the information message are synchronized to each other prior to broadcasting the multi-stream broadcast of the television program to the interface; and
an overlayer performing one of displaying the overlay or hiding the overlay based on a user instruction and the information message.

10. The system of claim 9, wherein the information message includes the label of the overlay.

11. The system of claim 10, wherein the information message further includes the transparency parameter corresponding to the overlay.

12. The system of claim 9, wherein the multi-stream broadcast further includes a further overlay for the video.

13. The system of claim 12, wherein the further overlay is included in one of the first auxiliary stream of the one or more auxiliary streams and a second auxiliary stream of the one or more auxiliary streams.

14. The system of claim 9, wherein the information message is a supplemental enhancement information (SEI) message and wherein the multi-stream broadcast is encoded according to the second version of the High Efficiency Video Coding standard.

15. The system of claim 9, wherein the overlay includes one of a score of a game, a game clock, a player name, a player role, a current game statistic, a historical game statistic, a position of an in-game object, a news ticker, a stock ticker, and an advertisement.

16. The system of claim 9, wherein the overlay comprises an image including a plurality of pixels.

17. A method, comprising:
receiving a multi-stream broadcast of a television program over a single transmission channel, the multi-stream broadcast of the television program including a primary stream, one or more auxiliary streams and an information message, wherein the primary stream includes a video of an event, a first auxiliary stream of the one or more auxiliary streams includes an overlay for the video, a second auxiliary stream of the one or more auxiliary streams includes a label for the overlay and a third auxiliary stream of the one or more auxiliary streams includes a transparency parameter corresponding to the overlay, wherein the overlay is generated based on at least data from a video capture arrangement that is capturing the video of the event, wherein information message corresponds to the video and the overlay,
wherein the video, the overlay, and the information message are synchronized to each other prior to the reception of multi-stream broadcast of the television program over the single transmission channel; and
outputting a display that is based on the received multi-stream broadcast of the television program including the video based on a user selection to either display the overlay or hide the overlay and the information message, the display including the overlay when the user selection is to display the overlay, the display not including the overlay when the user selection is to hide the overlay.

* * * * *